3,369,413
VARIABLE SPEED TRANSMISSION
Douglas F. McFarland and David Lee McFarland,
both of Davis City, Iowa 50065
Continuation-in-part of application Ser. No. 483,748,
Aug. 30, 1965. This application Dec. 30, 1965, Ser.
No. 517,612
9 Claims. (Cl. 74—60)

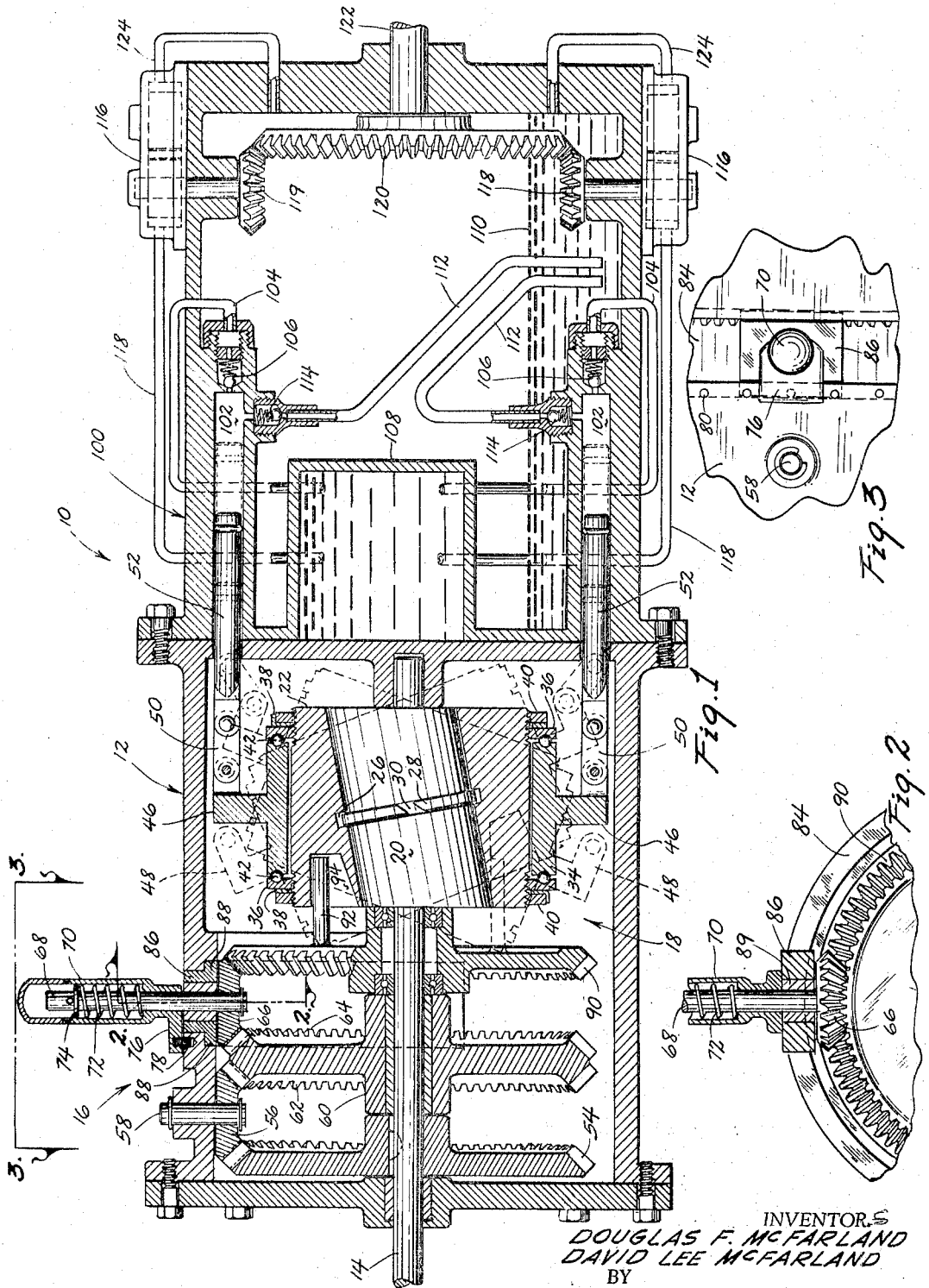

ABSTRACT OF THE DISCLOSURE

A transmission having a swash plate assembly including an elongated shaft, a cylindrical member mounted on the shaft at an angle to the longitudinal axis of the shaft, a second cylindrical member having an opening therethrough and said first cylindrical member mounted in said opening, said first cylindrical member and the opening of the second cylindrical member having a common longitudinal axis, control means for selectively interconnecting and rotating the first and second cylindrical members relative to each other wherein the outer peripheral surface of the second cylindrical member has a uniform radius of curvature about its center longitudinal axis at times and at other times has a radius of curvature which varies along the length of the outer surface of the cylindrical member whereby in the latter positions points on the outer surface of the second cylindrical member move back and forth along the longitudinal axis of the shaft as the shaft is rotated, and said first and second members being rotatably mounted in a nonrotatable sleeve member to thereby cause rectilinear movement of the sleeve member, a plurality of piston assemblies connected to the sleeve member and being in communication with a manifold which in turn is in communication with one or more hydraulic motors, which are coupled to a common output drive gear.

---

This application is a continuation-in-part of applicants' co-pending application, Serial No. 483,748, filed Aug. 30, 1965, entitled Variable Speed Transmission.

This invention involves the conversion of rotational movement to rectilinear movement and then back to rotational movement. Also, a control unit for selectively varying a magnitude of the rectilinear movement is provided. Also, a rectilinear output may be designed to drive any number of pistons which in turn may operate any number of hydraulic motors. A fluid manifold may be provided between the pistons and the hydraulic motors whereby the hydraulic motors will operate at a uniform speed. Each of the hydraulic motors may in turn be connected to a common output drive gear to produce torque power.

The conversion of rotational movement to rectilinear movement is through a wobble plate assembly which can be continuously variated from a wobbling action to a neutral position.

This invention consists in the construction, arrangements, and combination of the various parts of the device, whereby the purposes contemplated are attained as hereinafter more fully set forth, specifically pointed out in the claims, and illustrated in the accompanying drawings in which:

FIG. 1 is a longitudinal elevational view of the variable speed transmission;

FIG. 2 is a cross-sectional view taken along line 2—2 in FIG. 1; and

FIG. 3 is a fragmentary top view taken along line 3—3 in FIG. 1.

The variable speed transmission of this invention is referred to generally in FIG. 1 by the reference numeral 10, and includes an outer housing 12 through which a drive shaft 14 extends. A control unit 16 is positioned in one end of the housing 12 and a variable speed output assembly 18 is provided in the other end of the housing 12.

As seen in FIG. 1, a first cylindrical member 20 is integrally mounted on the input drive shaft 14 and is disposed with its center longitudinal axis extending at an angle to the longitudinal axis of the drive shaft 14. Matingly embracing the inner cylindrical member 20 is an outer cylindrical member 22 which has a cylindrical opening 24 extending therethrough with its longitudinal axis extending at an angle to the center longitudinal axis of the cylindrical member 22. An annular recess 26 is formed centrally in the inner cylindrical member 20 to receive a snap lock ring 28 which is also received in an annular recess 30 formed in the inner wall of the cylindrical member 22 and thereby limits relative longitudinal movement between the two cylindrical members 20 and 22. Rotational movement of these members 20 and 22 is however permitted.

A collar or sleeve member 34 is limited against rotation inside the casing 12 and embraces the outer cylindrical member 22 whereby the two cylindrical members 20 and 22 rotate therein on the shaft 14. Each end of the outer cylindrical member 22 is threaded to receive a bearing plate 36, a lock washer 38 and a nut 40. A plurality of ball bearings 42 are disposed in hemispherical recesses formed in facing faces on the bearing plates 36 and the outer annular edges of the collar member 34. Accordingly, the collar member 34 is limited against relative longitudinal movement on the cylindrical members 20 and 22. Shaft 14 and the cylindrical members 20 and 22 are permitted to rotate relative to the collar member 34.

An annular shoulder 46 is integrally formed on the exterior of the collar member 34 intermediate its longitudinal length and is provided with ears 48 at diametrically opposite sides which are connected to link elements 50 which in turn are connected to power output slidable rod or piston members 52 which extend through the housing 12 end wall.

The control unit 16 includes a first gear 54 keyed to the drive shaft 14 and in engagement with a first spur gear 56 rotatably mounted to the peripheral wall of the housing 12 by a pin 58. A double face gear 60 is rotatably mounted on the shaft 14 with one of its faces 62 engaging the spur gear 56. The other or opposite face 64 engages a second spur gear 66 rotatably mounted on a pin 68 extending through the housing wall 12 into a handle sleeve member 70. A coil spring 72 embraces the pin 68 and bears against a washer 74 to maintain the bottom side of the sleeve 70 against the outer peripheral surface of the housing 12. An outwardly extending flange 76 having a detent element 78 is provided for selective engagement with a plurality of spaced apart holes 80 formed around the periphery of the housing 12 as best seen in FIG. 3. The housing 12 is provided with elongated rectangular opening 84 in which a rectangular guide element 86 is matingly mounted for slidable peripheral movement. The guide element 86 has outer longitudinal edges which include outwardly extending flanges 88 and an insert 89 is provided in direct mating embracing relationship about the pin 68.

Also in engagement with the spur gear 66 is another ring gear 90 rotatably mounted on the shaft 14. A pin 92 is provided on the face of the gear opposite its teeth for engagement in a cavity 94 formed in the inner rotatable member 22.

Thus, in operation it is seen that as the cylindrical members 20 and 22 are illustrated by the solid lines in FIG. 1 there would be no movement of the rods 52 since the outer peripheral surface of the outer cylindrical member 22 and accordingly the collar 34 have an equal radius of curvature relative to the longitudinal axis of the input shaft 14. Therefore, the shaft 14 would rotate the ring gear 54 which in turn rotates the spur gear 56 causing the double face ring gear 60 to be rotated as well as the spur gear 66 which finally rotates the ring gear 90. The pin 92 on the ring gear 90 drives the outer rotatable member 22. When output power is desired, the hand sleeve element 70 is lifted away from the housing 12 disengaging the detent 78 from the holes 80 and the spur gear 66 is then moved in either direction around the periphery of the housing 12 thereby causing the ring gear 90 to rotate relative to the other gears and the shaft 14 and consequently cause the outer rotatable member 22 to rotate relative to the inner rotatable member 20. Now, upon rotation of the drive shaft 14 the unit 18 will move between the dash line position shown in FIG. 1. Consequently the output pistons 52 will be reciprocated between the dash line positions illustrated. Any desired variation may be obtained by moving the spur gear 66 to the appropriate position along the periphery of the housing 12. It is to be appreciated that any number of output pistons may be connected by a similar linkage 50 to the annular rim 46 since it is not rotated but merely pivots or wobbles back and forth relative to the longitudinal center axis of the drive shaft 14. The cavity 90 in the outer cylindrical member 22 is formed with sufficient space to accommodate the finger 92 as the outer cylindrical member 22 moves between its extreme dash line positions of FIG. 1.

A second housing 100 is connected to the housing 12 and includes cylinders 102 for the pistons 52. An output conduit 104 is connected to the cylinders 102 through a ball check valve 106. The conduits 104 feed into a fluid manifold 108. A reservoir of hydraulic fluid 110 is provided within the housing 100 from which inlet conduits 112 supply the cylinders 102 with fluid through inlet check valves 114.

As shown in FIG. 1, a pair of hydraulic motors 116 are connected by conduits 118 in communication with the fluid reservoir 108. The hydraulic motors 116 are provided with spur gears 119 inside the housing 100 and engage a ring gear 120 mounted on an output drive shaft 122 having a common center access with the input drive shaft 14. The hydraulic motors are provided with return fluid lines 124 which are in communication with the fluid reservoir 110 inside the housing 100.

Thus it is seen that the rectilinear motion of the pistons 52 has been converted back to rotational motion in the gears 119 and 120. By use of the manifold 108 a constant and continuous power supply is applied to the output gear 120. As is obvious, any number of motors 116 could be provided even if only one piston and cylinder unit were employed. On the other hand, any number of piston and cylinder units might be employed to drive only one hydraulic motor 116. Therefore, the piston and cylinder assemblies, the hydraulic motors and the output drive shafts may be varied in number to meet the power requirements.

Some changes may be made in the construction and arrangement of our variable speed transmission without departing from the real spirit and purpose of our invention, and it is our intention to cover by our claims, any modified forms of structure or use of mechanical equivalents which may be reasonably included within their scope.

We claim:

1. A transmission, comprising, a pair of interconnected rotatable members adapted to be rotated relative to each other at times and as a unit at times, one of said members rotatable within the other member, a control unit for rotating said members relative to each other, output drive means connected to said rotatable members and said output power being varied as said rotatable members are rotated relative to each other, said control unit includes a drive shaft connected to one of said rotatable members, a gear means connected to said shaft and rotatable therewith, a second gear rotatable on said shaft operatively connected to said first gear and connected to said other rotatable member, and control means for selectively rotating said second gear relative to said first gear for rotating said other rotatable member relative to said one rotatable member, a double face gear is rotatably mounted on said shaft between said first and second gears, a spur gear interconnecting said first gear with one gear surface of said double face gear, a second spur gear interconnecting the second gear with the other gear surface of said double face gear, and said control means is connected to said second spur gear for selectively moving it between and in engagement with said other gear surface and said second gear.

2. The structure of claim 1 and a housing encloses at least said other gear surface of said double face gear and said second gear, said housing having an annular guide recess, said second spur gear being rotatable on a pin movable on a guide element, said guide being matingly and movably received in said guide recess.

3. The structure of claim 2 wherein said first spur gear is rigidly mounted to said housing.

4. A variable speed transmission, comprising,
a rotatable shaft,
an elongated cylindrical member mounted on said shaft and having a longitudinal center axis extending at an angle to the center longitudinal axis of said shaft,
a second elongated cylindrical member rotatably mounted on said first cylindrical member, said second cylindrical member having an opening for matingly receiving said first cylindrical member, said opening having a center longitudinal axis disposed at an angle to the center longitudinal axis of said second member, and is common to the longitudinal center axis of said first cylindrical member,
control means for interconnecting and selectively rotating said first and second cylindrical members relative to each other to one position of adjustment wherein the outer peripheral surface of said second cylindrical member has a uniform radius of curvature about the center longitudinal axis of said shaft and to other positions wherein said radius of curvature varies along the length of said outer surface of said second member whereby in said latter positions points on the outer surface of said second member move back and forth along the longitudinal axis of said shaft as said shaft is rotated, and
output drive means operatively connected to said second cylindrical member and comprising at least one piston and cylinder assembly, means connecting said piston to said second cylindrical member for reciprocation of said piston, and fluid inlet and outlet openings formed in said cylinder.

5. The structure of claim 4 and said cylinder is connected to a hydraulic motor having rotatable output power shaft.

6. The structure of claim 4 wherein said first and second cylindrical members rotate within a sleeve member, said rotatable members being adapted to cause rectilinear movement of said sleeve member, and said one piston being connected to said sleeve.

7. The structure of claim 6 wherein said one piston is one of a plurality of pistons connected to said sleeve, a cylinder for each of said pistons, a fluid manifold, each of said cylinders having an outlet connected to said manifold, at least one hydraulic motor having an input opening connected to said manifold.

8. The structure of claim 6 and a plurality of hydraulic motors are connected to said manifold, each of said motors having a gear in engagement with a common output drive gear.

9. The structure of claim 8 wherein said pistons and cylinders are positioned on a circular line concentric with the longitudinal axis of said rotatable shaft connected to said first cylindrical member, said output drive gear being mounted on a shaft having a longitudinal axis substantially an extension of the longitudinal axis of said rottatable shaft.

References Cited

UNITED STATES PATENTS

| | | | |
|---|---|---|---|
| 1,354,209 | 9/1920 | Peterson | 60—53 |
| 3,033,047 | 5/1962 | Uchida | 74—60 |
| 3,153,386 | 10/1964 | Thompson | 74—60 |
| 3,166,952 | 1/1965 | Lang | 60—53 |
| 3,255,638 | 6/1966 | Livers | 74—60 |

FRED C. MATTERN, Jr., *Primary Examiner.*

C. J. HUSAR, *Assistant Examiner.*